United States Patent
Menheere et al.

(10) Patent No.: US 12,140,048 B1
(45) Date of Patent: Nov. 12, 2024

(54) INTEGRATED CENTRIFUGAL COMPRESSOR DIFFUSER AND HIGH PRESSURE TURBINE VANE ASSEMBLY

(71) Applicant: Pratt & Whitney Canada Corp., Longueuil (CA)

(72) Inventors: Dave Menheere, Norval (CA); Eduardo Hawie, Woodbridge (CA)

(73) Assignee: PRATT & WHITNEY CANADA CORP., Québec (CA)

( * ) Notice: Subject to any disclaimer, the term of this patent is extended or adjusted under 35 U.S.C. 154(b) by 0 days.

(21) Appl. No.: 18/541,606

(22) Filed: Dec. 15, 2023

(51) Int. Cl.
| | |
|---|---|
| F01D 9/04 | (2006.01) |
| B64D 33/02 | (2006.01) |
| F04D 29/28 | (2006.01) |
| F04D 29/44 | (2006.01) |
| F04D 29/54 | (2006.01) |

(52) U.S. Cl.
CPC .............. *F01D 9/04* (2013.01); *F04D 29/288* (2013.01); *F04D 29/44* (2013.01); *F04D 29/54* (2013.01); *B64D 2033/0293* (2013.01); *F05D 2220/323* (2013.01); *F05D 2240/12* (2013.01)

(58) Field of Classification Search
CPC ......... F05D 2220/324; F05D 2220/325; F05D 2220/326; F05D 2220/327; B64D 2033/0293

See application file for complete search history.

(56) References Cited

U.S. PATENT DOCUMENTS

| 5,163,285 | A | 11/1992 | Mazeaud et al. | |
|---|---|---|---|---|
| 6,279,322 | B1* | 8/2001 | Moussa | F04D 29/444 60/751 |
| 11,098,730 | B2* | 8/2021 | Mazur | F04D 17/10 |
| 2009/0148297 | A1* | 6/2009 | Suciu | F01D 5/3007 29/889.21 |
| 2016/0115971 | A1* | 4/2016 | Duong | F01D 9/045 29/889.22 |
| 2016/0169049 | A1* | 6/2016 | Eastwood | F01D 25/28 415/213.1 |
| 2018/0274376 | A1* | 9/2018 | King | B22F 5/10 |
| 2019/0293087 | A1* | 9/2019 | Tamada | F04D 29/441 |
| 2020/0248571 | A1* | 8/2020 | King | B33Y 10/00 |
| 2020/0370567 | A1* | 11/2020 | Duong | F04D 17/10 |
| 2020/0378303 | A1* | 12/2020 | Nichols | F02C 6/06 |
| 2022/0018310 | A1* | 1/2022 | Humes | F01D 11/003 |

* cited by examiner

*Primary Examiner* — Brian Christopher Delrue
(74) *Attorney, Agent, or Firm* — CANTOR COLBURN LLP (57) ABSTRACT

Gas turbine engines include a compressor section having an impeller configured to compress a core flow. A combustor section having a combustor is arranged downstream from the compressor section along a path of the core flow. A turbine section is arranged downstream from the combustor section along the path of the core flow, with the turbine section having a plurality of first vanes arranged at an outlet of the combustor and at least one first vane of the plurality of first vanes includes an internal vane path. The path of the core flow, in a flow direction, passes through the impeller of the compressor section, the internal vane path internal to the first vane, the combustor, and then between external surfaces of the plurality of first vanes to enter the turbine section.

20 Claims, 7 Drawing Sheets

INTEGRATED CENTRIFUGAL COMPRESSOR DIFFUSER AND HIGH PRESSURE TURBINE VANE ASSEMBLY

BACKGROUND

The subject matter disclosed herein generally relates to components for turbine engines and, more particularly, to compressor, combustor, and turbine arrangements of turbine engines.

Aircraft engines, such as gas turbine engines, typically include a fan to generate an airflow to be passed into an engine core and may direct a portion or a significant portion of the air around the engine core as a bypass flow. The engine core typically includes, in a direction from forward to aft, the fan, a compressor section, a combustor section, and a turbine section. Typically, the combustor must follow the compressor axially such that compressed air from the compressor section is directed into and mixed with fuel for combustion within one or more combustors of the combustor section. Due to the configurations and components of each section of the engine core, the axial length the engine cannot be shortened. Further, in operation, a relatively large compressor may be required to provide thorough cooling throughout the engine core. Bleed cooling flow may enter into the core gas path. Bleed air cooling of high-pressure turbine (HPT) vanes of the turbine section in current configurations necessarily reduces the amount of cool air available for cooling the combustor and for combustion. That is, a portion of the cooling air, taken from the compressor section, may be diverted around the combustor section to provide cooling to the vanes of the turbine section. The amount of air for cooling the vanes of the turbine section can be over 15% of core flow, which must be compensated for in the design process by increasing the core size.

SUMMARY

According to some embodiments, gas turbine engines are provided. The gas turbine engines include a compressor section having an impeller configured to compress a core flow, a combustor section having a combustor, with the combustor arranged downstream from the compressor section along a path of the core flow, and a turbine section arranged downstream from the combustor section along the path of the core flow, with the turbine section having a plurality of first vanes arranged at an outlet of the combustor, and at least one first vane of the plurality of first vanes includes an internal vane path. The path of the core flow, in a flow direction, passes through the impeller of the compressor section, the internal vane path internal to the first vane, the combustor, and then between external surfaces of the plurality of first vanes to enter the turbine section.

In addition to one or more of the features described herein, or as an alternative, further embodiments of the gas turbine engine may include that at least a portion of the impeller is arranged radially inward from the combustor and at the same axial position as the combustor along an engine axis.

In addition to one or more of the features described herein, or as an alternative, further embodiments of the gas turbine engine may include that the internal vane path has an increasing cross-sectional area extending in a direction of flow of the core flow.

In addition to one or more of the features described herein, or as an alternative, further embodiments of the gas turbine engine may include that the combustor is arranged within a combustor cavity and the internal vane path fluidly connects the impeller with the combustor cavity.

In addition to one or more of the features described herein, or as an alternative, further embodiments of the gas turbine engine may include that the combustor cavity comprises an inner diameter portion, wherein compressed air supplied through the internal vane path fills, at least, the inner diameter portion.

In addition to one or more of the features described herein, or as an alternative, further embodiments of the gas turbine engine may include that the inner diameter portion is defined in a radial direction relative to an engine axis between an outer diameter surface of a part of the compressor section and an inner diameter surface of the combustor.

In addition to one or more of the features described herein, or as an alternative, further embodiments of the gas turbine engine may include that the path of the core flow is in an axial forward direction through at least a portion of the compressor section and is turned in a radially outward direction by the impeller and flows radially outward through the internal vane path into a combustor cavity housing the combustor.

In addition to one or more of the features described herein, or as an alternative, further embodiments of the gas turbine engine may include that the core flow path is turned to flow axially aft relative to the engine axis as it exits the internal vane path to surround the combustor and provide air thereto.

In addition to one or more of the features described herein, or as an alternative, further embodiments of the gas turbine engine may include a diffuser element attached to an outer diameter platform of the first vane, wherein the internal vane path fluidly connects to the diffuser element, the diffuser element configured to diffuse and direct the core flow around the combustor.

In addition to one or more of the features described herein, or as an alternative, further embodiments of the gas turbine engine may include that each first vane of the plurality of first vanes includes an internal vane path.

In addition to one or more of the features described herein, or as an alternative, further embodiments of the gas turbine engine may include that the plurality of first vanes extend in a radial direction relative to an engine axis between an inner diameter platform and an outer diameter platform, wherein an outlet of the impeller is fluidly coupled to the inner diameter platform.

In addition to one or more of the features described herein, or as an alternative, further embodiments of the gas turbine engine may include a diffusing element arranged at an outlet of the internal vane path.

In addition to one or more of the features described herein, or as an alternative, further embodiments of the gas turbine engine may include that the outer diameter platform comprises a diffuser element mount, wherein the diffusing element is attached to the outer diameter platform at the diffuser element mount.

In addition to one or more of the features described herein, or as an alternative, further embodiments of the gas turbine engine may include that each first vane of the plurality of first vanes includes an internal vane path and each first vane of the plurality of first vanes includes a respective diffusing element arranged at an outlet of the respective internal vane path.

In addition to one or more of the features described herein, or as an alternative, further embodiments of the gas turbine engine may include that the internal vane path has a smaller cross-sectional area at the inner diameter platform than a cross-sectional area at the outer diameter platform.

In addition to one or more of the features described herein, or as an alternative, further embodiments of the gas turbine engine may include that each first vane of the plurality of first vanes is angled in a direction of rotation of a rotating assembly of the gas turbine engine to direct the core flow as it exits the combustor in the direction of rotation of the rotating assembly.

According to some embodiments, methods of operating gas turbine engines are provided. The gas turbine engines include a compressor section, a combustor section, and a turbine section, with at least a portion of the compressor section is arranged axially aligned with a combustor of the combustor section and radially inward from the combustor. The methods include compressing air of a core flow through an impeller of the compressor section, directing the compressed air through an internal vane path of at least one first vane of a plurality of first vanes of the turbine section as a radial direction flow, receiving the compressed air within the combustor to generate hot combustion gas, and directing the hot combustion gas between the plurality of first vanes and into the turbine section.

In addition to one or more of the features described herein, or as an alternative, further embodiments of the methods may include diffusing the core flow through the internal vane path.

In addition to one or more of the features described herein, or as an alternative, further embodiments of the methods may include diffusing the core flow through a diffuser element attached to an outlet of the internal vane path.

In addition to one or more of the features described herein, or as an alternative, further embodiments of the methods may include turning a flow of the hot combustion gas as it passes between the plurality of first vanes in a direction of rotation of a rotating assembly of the gas turbine engine.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
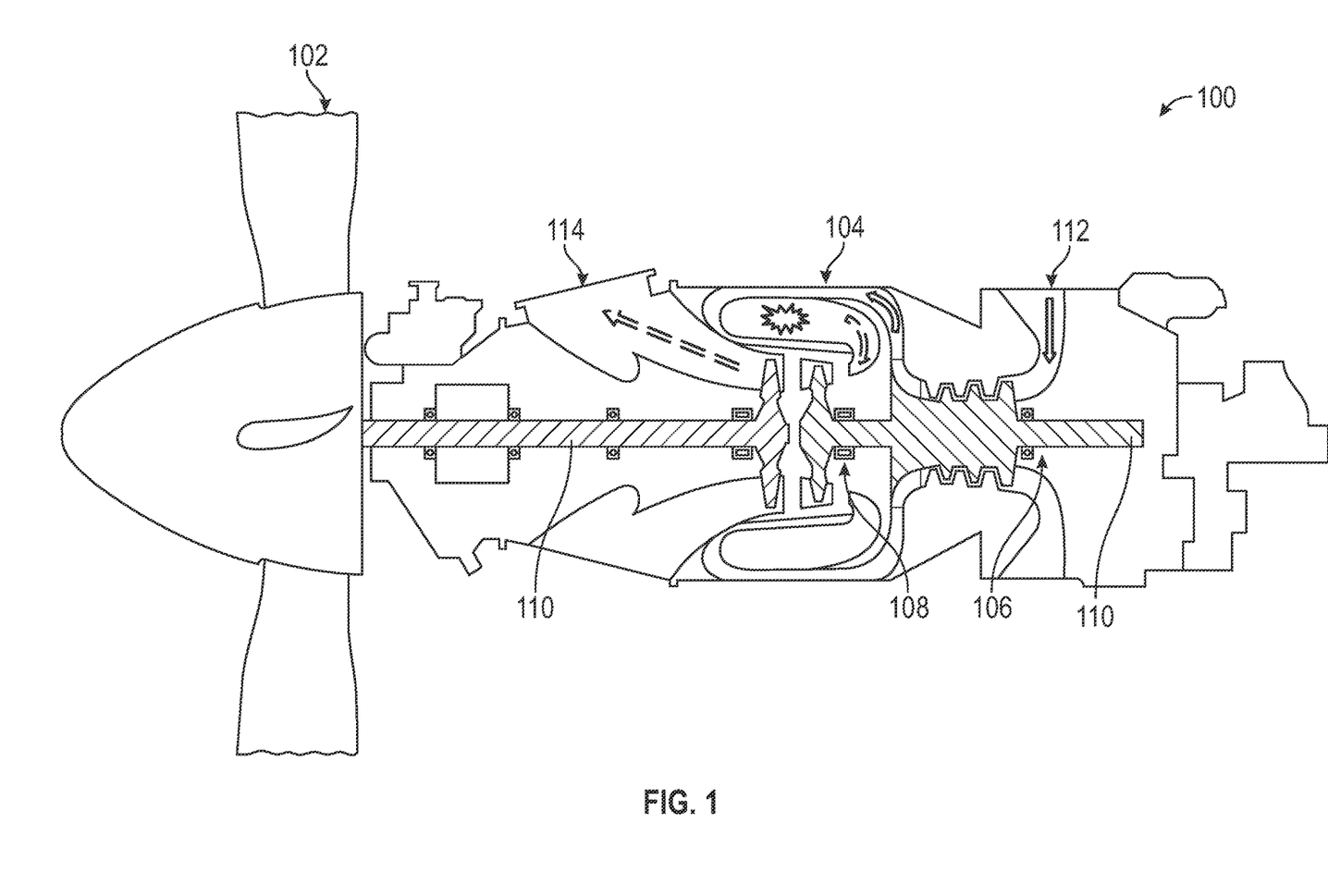
FIG. 1 is a schematic illustration of an aircraft engine in accordance with an embodiment of the present disclosure.

FIG. 1 is a schematic illustration of an aircraft engine 100 that may incorporate embodiments of the present disclosure. The aircraft engine 100 includes a fan section 102, a combustion section 104, a compressor section 106, and a turbine section 108. The aircraft engine 100 may be mounted to an aircraft fuselage and operationally driven to provide propulsive or motive force for flight of the aircraft. During operation, the combustion section 104 will combust a fuel that is mixed with air. In this illustrative configuration of the aircraft engine 100, air may be compressed in the compressor section 106 and the compressed air may be then directed into the combustion section 104 for combustion with the fuel. The combusted fuel and air mixture will then be directed into and through the turbine section 108 to drive an engine shaft 110 or the like, which in turn will cause rotation of the fan section 102. The engine shaft 110 may be formed of one or more shaft sections and/or spools. As will be appreciated by those of skill in the art.

The engine shaft 110 is illustratively shown as connected to the fan section 102 of the aircraft engine 100. In some configurations, the engine shaft 110 may be directly coupled to a fan rotor or the like or may be connected thereto through a gear system, a clutch system, or the like. The engine shaft 110 defines an engine axis, engine centerline, or central axis thereof. The fan section 102, combustion section 104, compressor section 106, and the turbine section 108 may all be full circumferent or hoop structures arranged about the engine axis, with the fan section 102 at the forward end and the turbine section 108 at the aft end. The radially direction is an outward direction from the engine axis (or engine shaft 110) and the axial direction is parallel to the direction of the engine axis.

In operation, air may enter the compressor section 106 at an air intake 112, which may be sourced from a bypass flow in a duct arranged radially outward from the air intake 112, as will be appreciated by those of skill in the art. The air is then compressed in the compressor section 106, combusted with fuel in the combustor section 104, and the hot gas output from the combustor section 104 will pass through the turbine section 108 and then be exhausted out an exhaust exit 114. The exhaust exit 114 may dump into a bypass duct of the aircraft engine 100.

It will be appreciated that the illustrative configuration of FIG. 1 is merely illustrative and provided for explanatory purposes only. Various types of compressor configurations, turbine configurations, combustor configurations and the like may be implemented on engines without departing from the scope of the present disclosure. For example, although shown in FIG. 1 with the hot gas traveling in a forward direction (from the turbine section 108 to the exhaust exit 114), in other engine configurations, the hot gas may be directed through an impeller type compressor and then routed in an aftward flowing direction through a turbine. The hot gas may then be directed from the turbine into a bypass flow or the like and/or exhausted out an aft end of the engine system. As such, it will be appreciated that the specific illustrative configuration and arrangement of components shown in FIG. 1 is merely representative and not intended to be limiting on the disclosure herein.

Conventionally, the combustor of a gas turbine engine must follow the compressor section in an axial direction relative to the engine axis, and thus shortening of engine is difficult. Further, a large compressor is needed to provide thorough cooling to the engine, with a portion of the compressed air bled from the compressor for cooling of various engine components. This bleed air is thus removed from the potential total airflow for the combustor, and thus the size of the compressor may need to be increased to accommodate this bleed air extraction. Furthermore, because the bleed air must be routed through various mechanisms and then used for cooling, a portion of the bleed cooling flow may enter a core flow gas path. Bleed air cooling of the high-pressure turbine (HPT) vane in conventional engine configurations reduces the amount of air available for cooling the combustor and for combustion. The amount of air for cooling the HPT vane can be over 15% of core flow which must be compensated for in the design process by increasing the core size.

In view of this, and other considerations, the engine configurations described herein integrate a compressor diffuser with a high-pressure turbine (HPT) blade assembly to reduce or eliminate bleed cooling flow into the gas path. Additionally, in accordance with some embodiments, the compressor air is used for back face cooling of the HPT vane (e.g., internal cooling flow). The process of cooling the HPT vane also adds energy in the form of heat to the compressed air before it enters the combustor, and such heat pickup can improve efficiency of the combustion process. In accordance with some embodiments, a centrifugal compressor is arranged such that at least the final compressor stage(s) is positioned to sit under (radially inward from) the combustor. In some embodiments, the entire centrifugal compressor (or the bladed portion thereof) may be arranged radially inward relative to the combustor. This axial alignment but radial stacking of at least a portion of the compressor section and the combustor results in a shortening of the overall engine length. Such configurations can improve shaft dynamics and/or reduce total engine weight.

Additionally, advantageously, embodiments of the present disclosure allow the impeller to have a lower pressure ratio as compared to conventional impeller engines. Such reduced pressure ratio can minimize the height (size) of the impeller and allows for an optimal gas path for an integrated compressor diffuser and HPT vane, as shown and described herein. The centrifugal compressor diffuser vane may be configured as traditional HPT vane and leans it into a direction of rotation of the rotating assembly (e.g., turbine disk rotation). The internal structure of the HPT vane is formed as the diffuser, progressing to a larger area as it moves radially outward. Fishtails may be added at an outlet of the HPT vane to provide additional diffusion. The cool air flowing through the vanes cools the HPT vanes. After exiting the HPT vanes, the cool flow from the compressor through the HPT vanes will surround the combustor and enter a combustion chamber for combustion with fuel through, for example, impingement holes and/or effusion holes, as will be appreciated by those of skill in the art. The hot flow from the combustor is then directed between the vanes of the HPT and into the downstream parts of the turbine section to drive shafts or spools of the engine. In accordance with embodiments of the present disclosure, the disclosed arrangement and configuration of components can result in a shortened engine axial length. For example, and without limitation, the engines of the present disclosure can be shortened by approximately 6" as compared to a conventional in-line, axial arrangement. Advantageously, this allows for the use of a smaller compressor and the final stages of the compressor can have a lower radius with increased blade height.

Figure 2A:
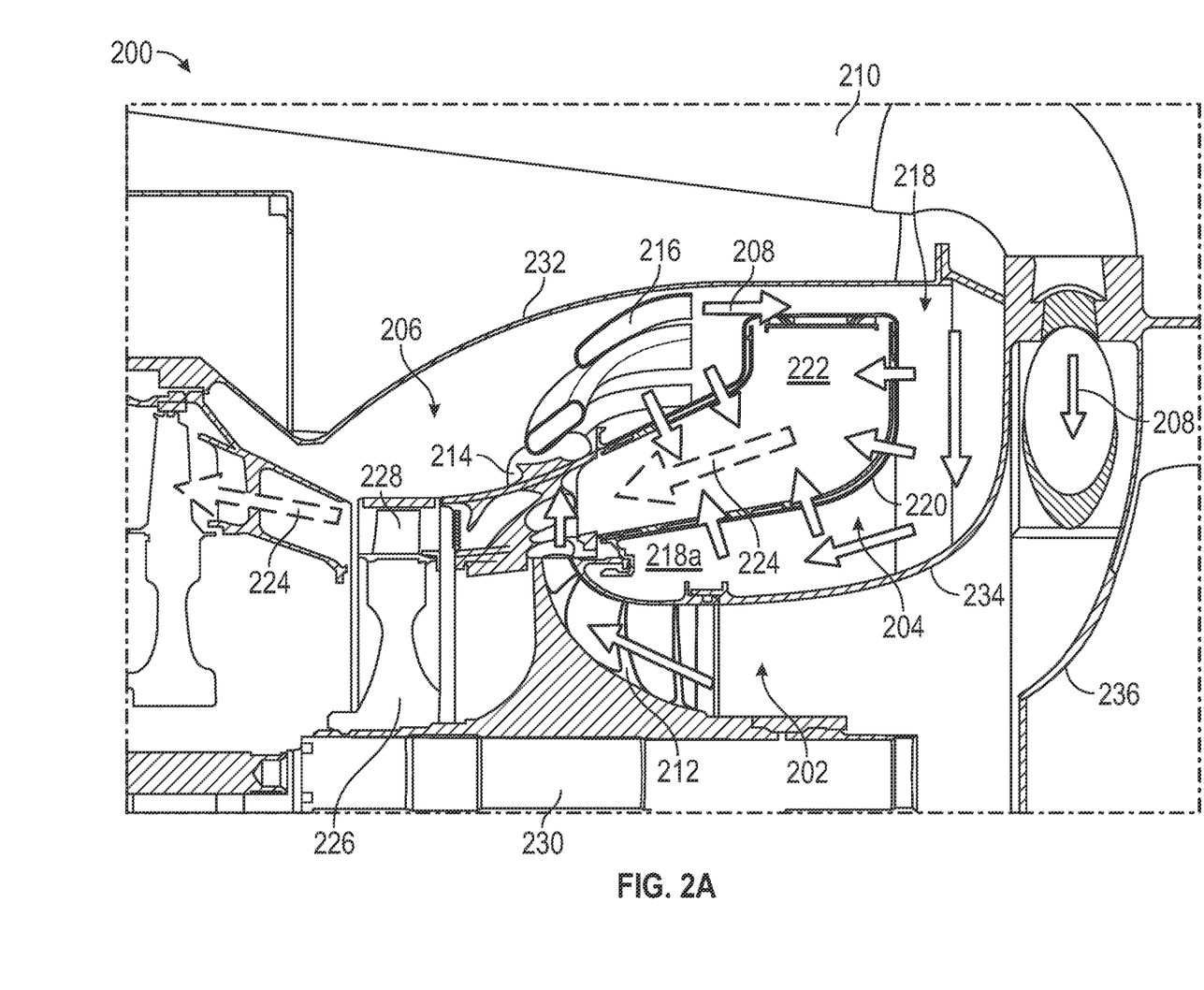
FIG. 2A is a schematic illustration of a portion of a gas turbine engine in accordance with an embodiment of the present disclosure.
Figure 2B:
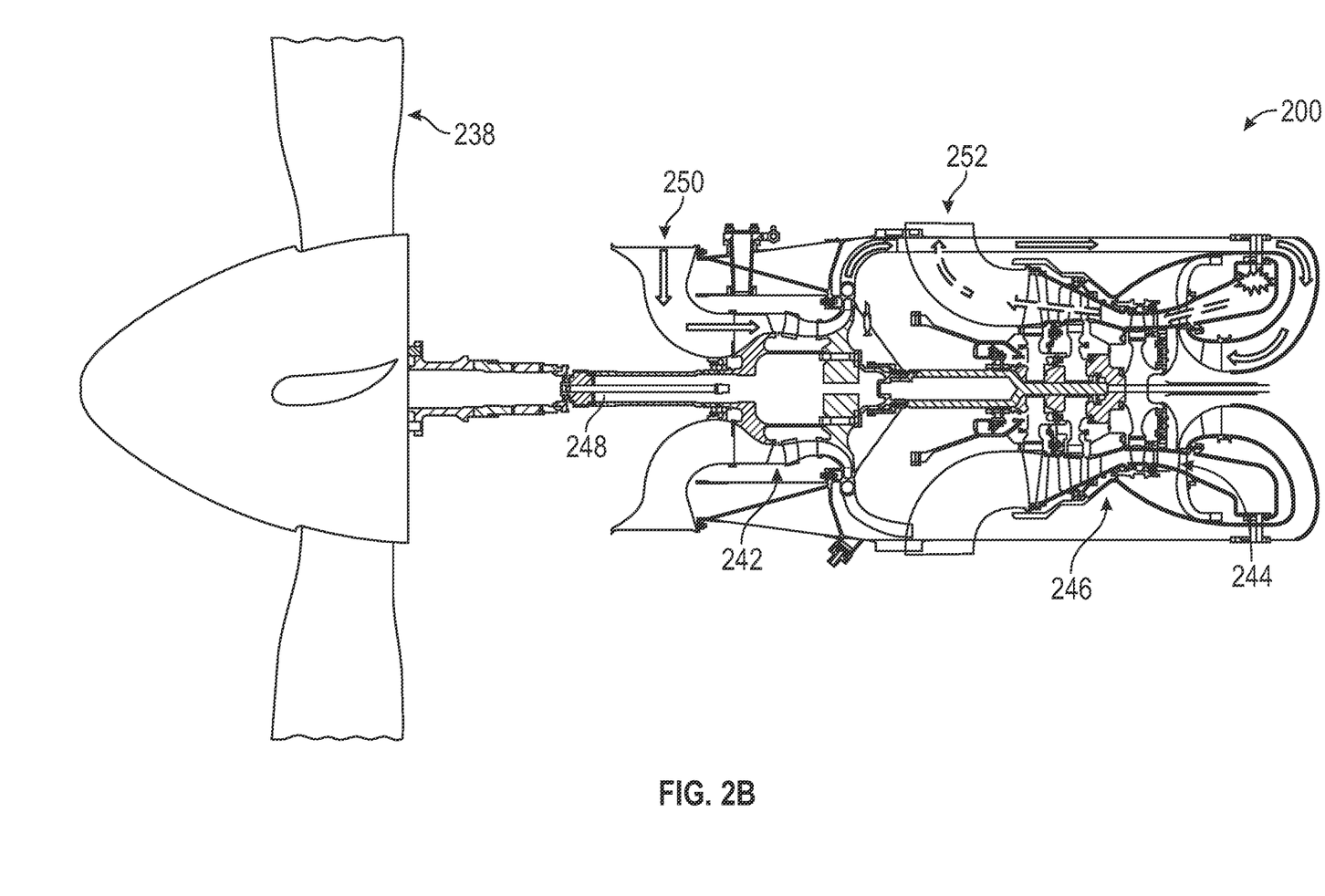
FIG. 2B is a schematic illustration of an aircraft engine incorporating the structure shown in FIG. 2A.

Referring now to FIGS. 2A-2B, schematic illustrations of a gas turbine engine 200 are shown. The gas turbine engine 200 may be similar to that shown and described with respect to FIG. 1, and is configured as an impeller-type engine. The gas turbine engine 200 includes a compressor section 202, a combustion section 204, and a turbine section 206. As shown, core flow air 208 may be supplied into the compressor 202 from a core flow duct 210. The relatively cool core flow air 208 will enter an impeller 212 of the compressor section 202. The impeller 212 will compress the core flow air 208 and then direct the core flow air 208 through a first vane structure 214 of the turbine section 206 of the engine 200. The core flow air 208 will then be expanded or diffused through the first vane structure 214 and optional diffuser elements 216 (e.g., fishtail or otherwise spreading/diffusing structures) arranged at a downstream end of the first vane structure 214 relative to a core flow path. The diffused core flow air 208 will then direct to fill a combustor cavity 218 of the combustor section 204. A combustor 220 is arranged within the combustor cavity 218 and defines a combustion chamber 222 therein.

Within the combustion chamber 222, the core flow air 208 is mixed with a fuel and ignited for combustion within the combustion chamber 222. The fuel may be injected into the combustion chamber 222 from one or more fuel nozzles, as will be appreciated by those of skill in the art. As the mixture of core flow air 208 and fuel are mixed and combusted, a hot core gas 224 (e.g., combusted air and fuel) will be directed through an exit or outlet of the combustion chamber 222 and passed between vanes of the first vane structure 214. The hot core gas 224 is turned by the vanes of the first vane structure 214 and drives rotation of a first turbine 226 which includes blades 228 and may be operably coupled to a shaft 230. The hot core gas 224 may then flow in an axially forward direction through the rest of the turbine section 206, as will be appreciated by those of skill in the art. The hot core gas 224 may then be turned aftward and mixed or injected into a bypass flow of the gas turbine engine 200, as will be appreciated by those of skill in the art. In some engine configurations, the bypass flow may be through a duct that is arranged radially outward from the core flow duct 210.

As shown, the combustor cavity 218 is defined, in part, between an outer diameter combustor cavity case 232 and an inner diameter combustor cavity case 234. The inner diameter combustor cavity case 234 may also define a portion of the input path that connects the core flow duct 210 to the impeller 212 of the compressor section 202. With this configuration, an inner diameter portion 218a of the combustor cavity 218 is defined between an inner diameter surface of the combustor 220 and an outer diameter surface of the inner diameter combustor cavity case 234. An outer diameter surface of the impeller 212, in accordance with some embodiments, may also define a surface of the inner diameter portion 218a of the combustor cavity 218. The inner diameter combustor cavity case 234 includes an inner diameter side that is a part of the core flow duct 210 and/or a part of the impeller 212 and an outer diameter side that is part of the combustor cavity 218. The core flow duct 210 is defined, in part and proximate the combustion section 204, by an engine case 236 and the inner diameter combustor cavity case 234.

FIG. 2B illustrates the gas turbine engine 200 having the structure illustrated in FIG. 2A. The gas turbine engine 200 includes a fan section 238, a combustion section 240, a low pressure compressor section 242, a low pressure compressor section 244, and a turbine section 246 arranged about an engine shaft 248. In operation, fan driven air (e.g., through a bypass duct or the like) will enter the low pressure compressor section 242 at an air intake 250, and flow through the system, as described with respect to FIG. 2A. The hot combusted gas will then exit through an exhaust outlet 252, which may dump into the bypass duct at a location downstream from the air intake 250 along the bypass duct.

Figure 3A:
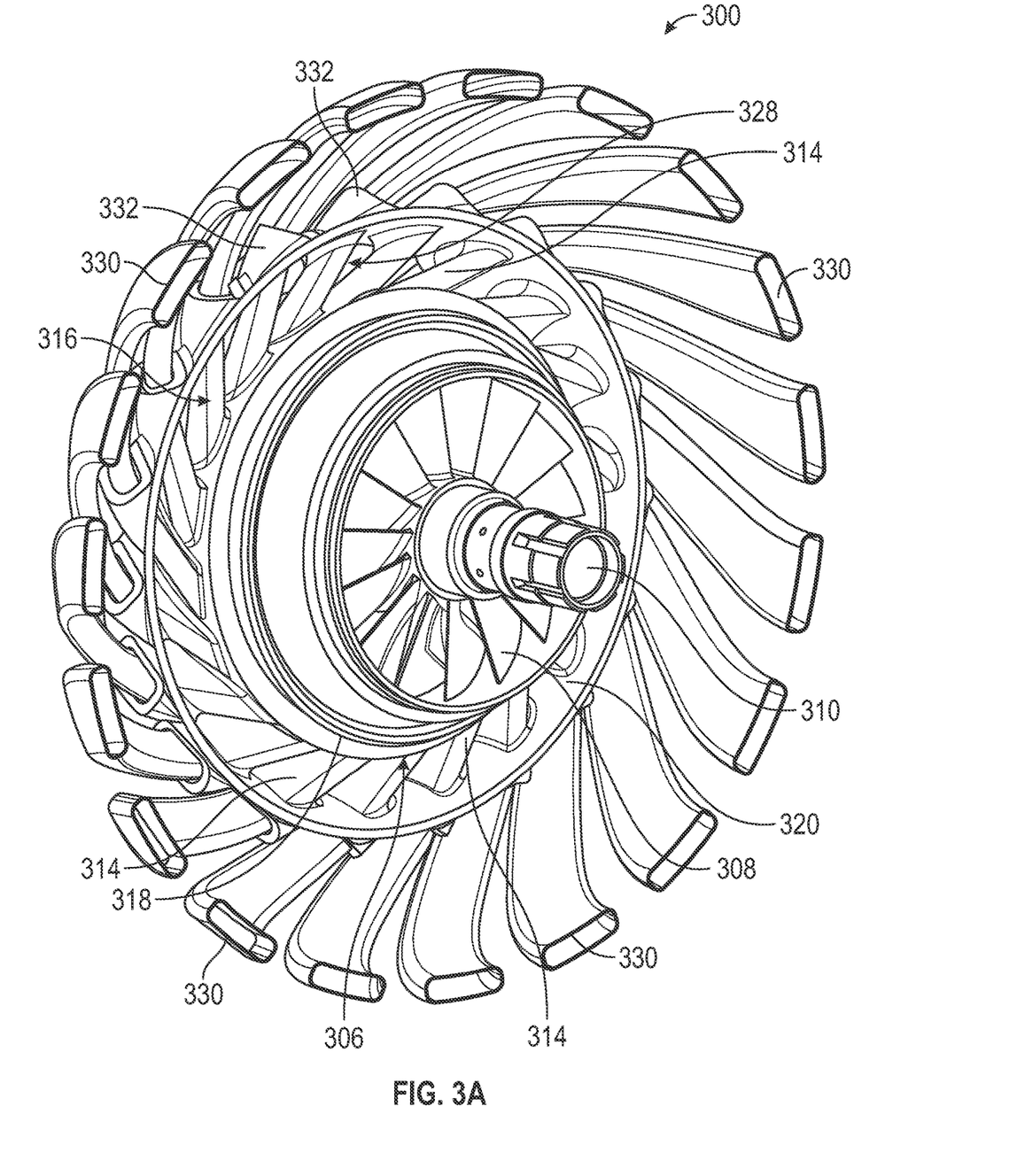
FIG. 3A is a schematic illustration of an integrated centrifugal compressor diffuser and high pressure turbine vane assembly in accordance with an embodiment of the present disclosure.
Figure 3B:
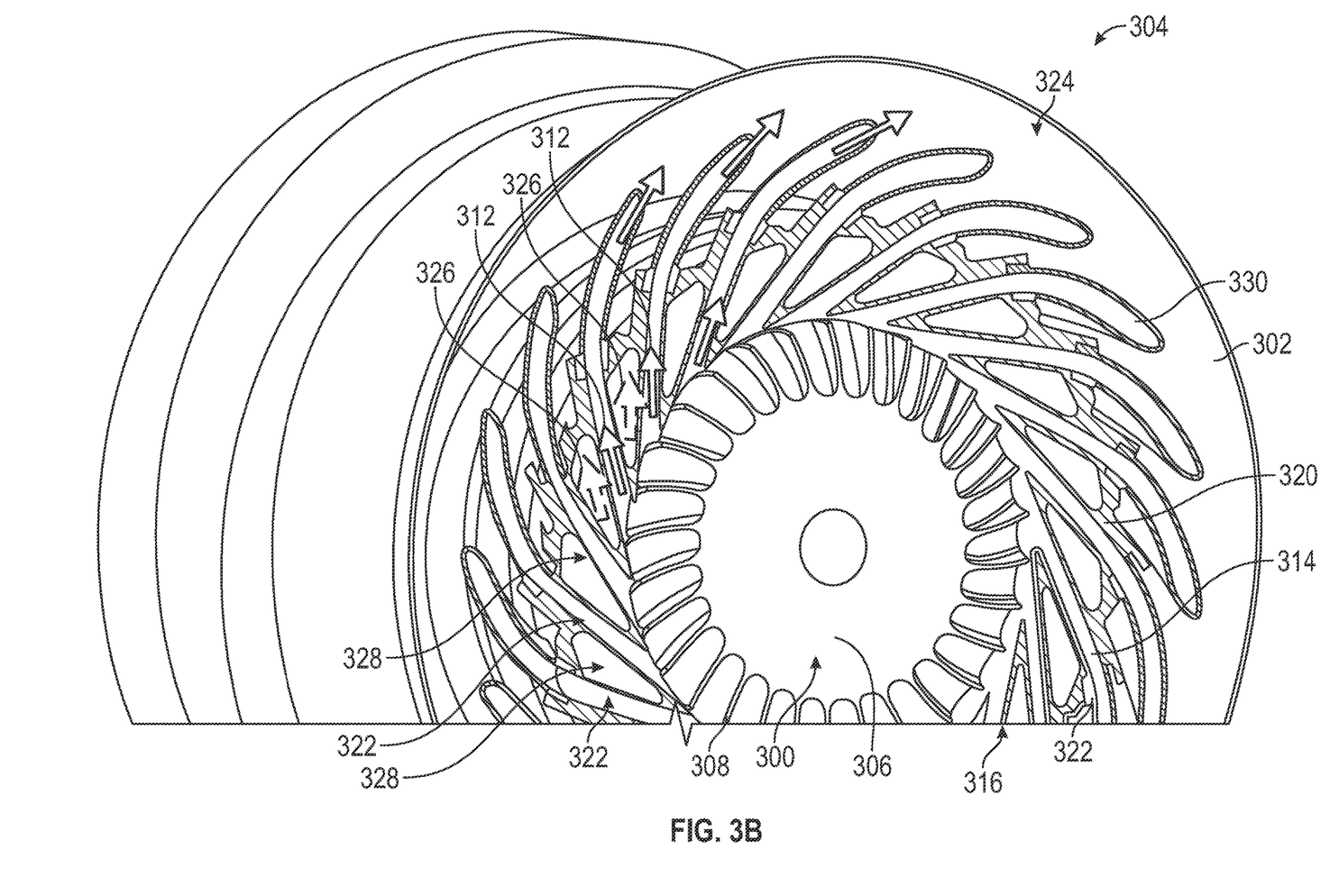
FIG. 3B is a schematic illustration of the integrated centrifugal compressor diffuser and high pressure turbine vane assembly as housed within a part of a gas turbine engine.

Referring now to FIGS. 3A-3B, schematic illustrations of an integrated centrifugal compressor diffuser and high pressure turbine vane assembly 300 in accordance with an embodiment of the present disclosure are shown. The integrated centrifugal compressor diffuser and high pressure turbine vane assembly 300 may be part of a gas turbine engine, such as an aircraft engine. The aircraft engine, in some configurations, may be a turboprop engine. The engine includes a compressor section, a combustion section, and a turbine section, such as shown and described above. A fan or the like may be rotationally driven by a shaft of the engine to generate thrust. FIG. 3A illustrates the integrated centrifugal compressor diffuser and high pressure turbine vane assembly 300 in isolation, and FIG. 3B illustrates the integrated centrifugal compressor diffuser and high pressure turbine vane assembly 300 as arranged within a portion of an engine case 302, forming a portion of a gas turbine engine 304.

As shown in FIGS. 3A-3B, the integrated centrifugal compressor diffuser and high pressure turbine vane assembly 300 includes an impeller 306 that is part of a compressor section of the engine. The impeller 306 includes a set of impeller blades 308 that are coupled to a shaft 310 (e.g., engine shaft or spool or portion of engine shaft/spool). The impeller 306 is arranged to receive a core air flow 312 (FIG. 3B) from a core flow duct or the like, such as shown and described above. The impeller 306 rotates and the impeller blades 308 will cause the core air flow 312 to be compressed and directed into and through a set of first vanes 314 of a turbine section 316 of the engine 304. The first vanes 314 are hollow body structures (e.g., airfoils) that extend in a radial direction between an inner diameter platform 318 and an outer diameter platform 320. As shown, the inner diameter platform 318 of the first vanes 314 may be mounted to or surround an outlet of the impeller 306 such that the compressed air from the impeller 306 is directed into and through an internal vane passage 322 of the first vanes 314.

The compressed core air flow 312 will pass through the internal vane passages 322 and enter a combustor cavity 324. The combustor cavity 324 is defined within the engine case 302 and contains a combustion chamber (see, e.g., FIGS. 2A-2B). The compressed core air flow 312 will then enter the combustion chamber and mix with a fuel for combustion within the combustion chamber. The resulting hot core gas 326 will then be directed through an outlet of the combustion chamber and passed between a space 328 defined between adjacent first vanes 314. As the hot core gas 326 passes through the space 328, a shape and angle of the first vanes 314 will turn the hot core gas 326 in a direction of rotation of rotating components (e.g., disks) of the turbine section 316. It is noted that the first vanes 314 are stationary components and the impeller 306 rotates relative to the first vanes 314, and is arranged radially inward from the first vanes 314.

In some configurations, and as shown in FIGS. 3A-3B, optional diffuser elements 330 (e.g., fishtail or otherwise spreading/diffusing structures) arranged at a downstream end of the first vanes 314 relative to a flow direction of the core air flow 312. The diffuser elements 330 may be installed and attached to the outer diameter platform 320 such that a continuous fluid path extends from an opening at the inner diameter platform 318, through the internal vane passage 322, and through the diffuser elements 330 before entering the combustor cavity 324. In the non-limiting illustrative embodiment of FIGS. 3A-3B, the outer diameter platform 320 may include diffuser element mounts 332 on an outer diameter surface thereof. The diffuser element mounts 332 may be structures or features configured to fixedly attach and mount the diffuser elements 330 to the outer diameter platform 320. The diffuser elements 330 are arranged with a gradually increasing cross-sectional area, in a direction of flow, such that the core flow passing through the diffuser elements 330 will expand and diffuse into the combustor cavity 324.

In operation, the core air flow 312 will exit the impeller 306 and flow in a radial direction through the internal structure (internal vane passage 322) of the first vanes 314. As such, the compressed core air flow 312 may provide back face (or internal) cooling to the first vanes 314. The process of cooling the first vanes 314 also adds energy to the core air flow 312 as it picks up heat from the hot material of the first vanes 314. That is, the downstream hot core gas 326, which is formed by combustion, will pass between exterior surfaces of the first vanes 314 and cause the material of the first vanes 314 to be heated. The internal, relatively cool core air flow 312 will pick up heat from this material and provide cooling to the first vanes 314. This added energy or heat, through heat pickup, can result in increased combustion efficiencies as the air introduced into the combustion chamber will be relatively warmer than if no such heat pick up occurred.

In addition to providing direct first vane cooling, embodiments of the present disclosure arrange at least the final compressor stages under (i.e., radially inward from) the combustor, thus shortening overall engine length and improving shaft dynamics and reducing weight significantly. As noted above, this engine configurations described herein may achieve lower pressure ratios of the impeller, as compared to conventional systems. Such reduction can minimize the height (size) of the system and allows for the optimized gas path for the integrated compressor diffuser and first vane assembly. Furthermore, as noted, the centrifugal compressor diffuser vane (first vane) modifies a conventional high pressure turbine vane and leans or turns it into the direction of rotation of the rotating assembly. The internal structure of the first vane is formed as, at least, part of the diffuser, progressing to a larger area as it moves outward. Further diffusing may be achieved by adding the optional diffuser elements, as shown and described above. The cool flow from the compressor flows through the first vanes and surrounds the combustor. The hot combustion flow from the combustor flows between the first vanes and is turned in the direction of rotation of the rotating assembly and passed between the first vanes to enter the rest of the turbine section of the engine. Furthermore, as noted, the engine can be shortened by approximately 6". This allows for the use of a smaller compressor and the final stages of the compressor to have a lower radius with increased blade height.

Figure 4A:
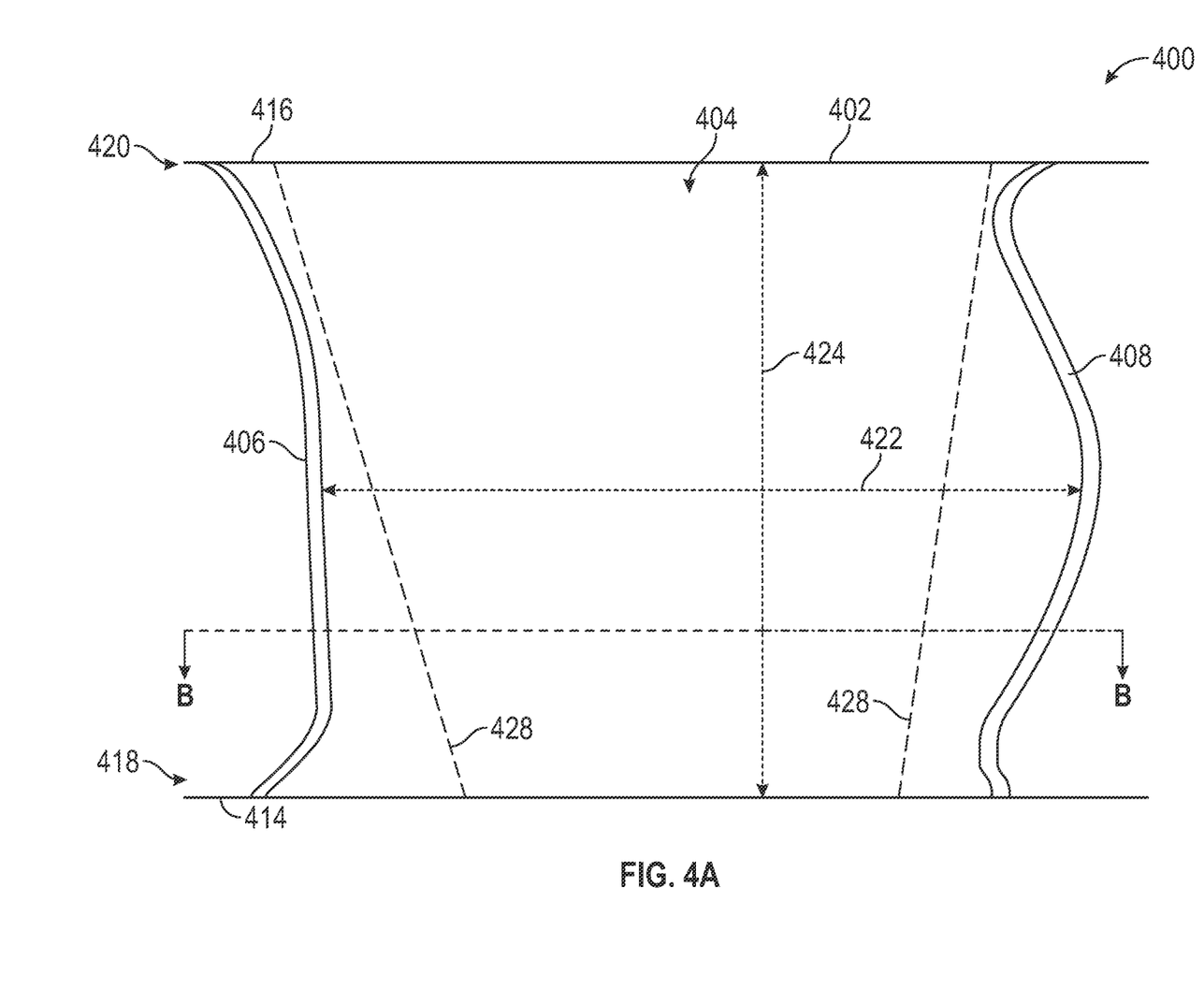
FIG. 4A is a schematic illustration of a vane in accordance with an embodiment of the present disclosure.
Figure 4B:
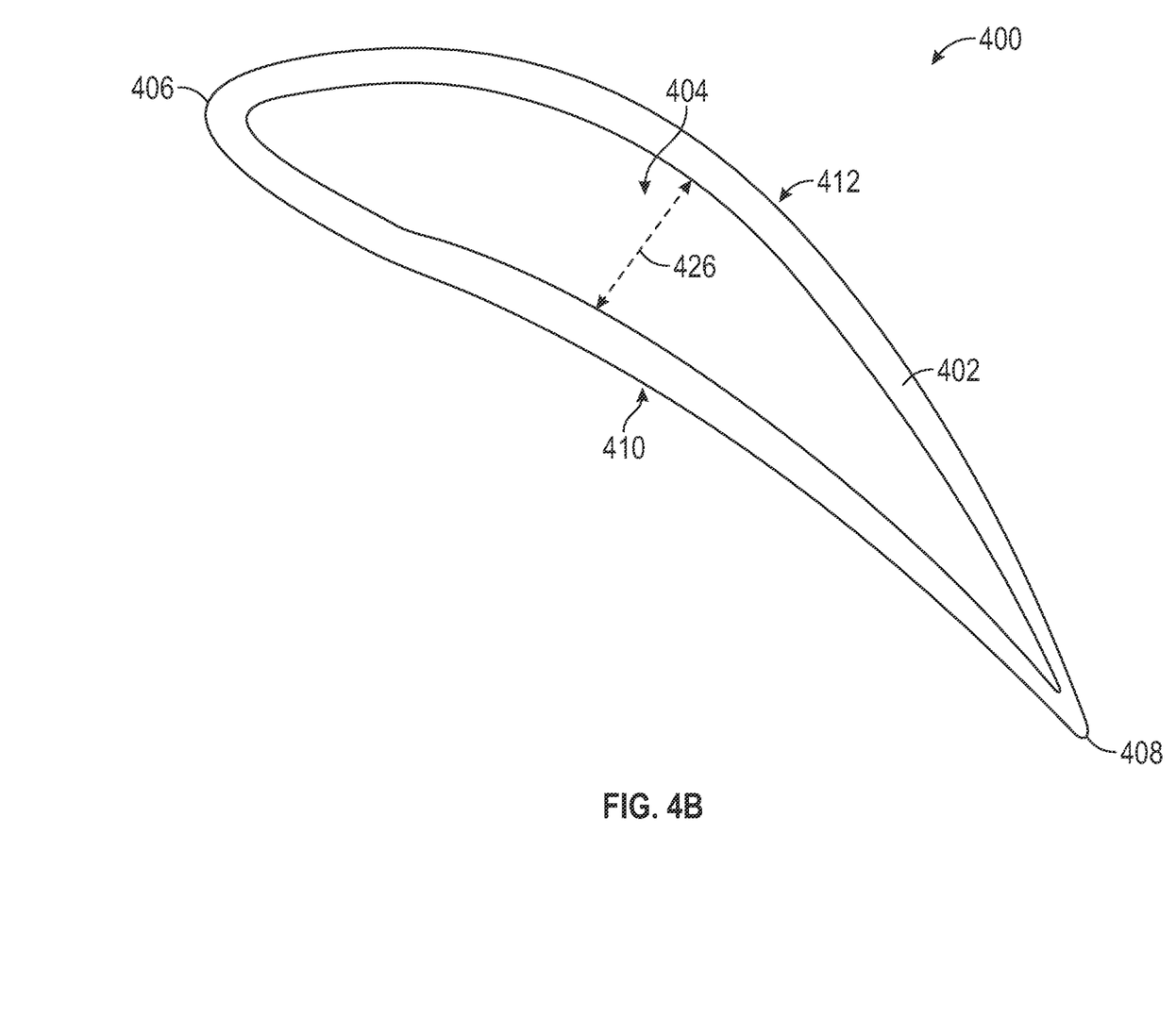
FIG. 4B is a cross-sectional illustration of the vane of FIG. 4A viewed along the line B-B of FIG. 4A.

Referring now to FIGS. 4A-4B, schematic illustrations of a first vane 400 of a turbine section of a gas turbine engine in accordance with an embodiment of the present disclosure are shown. FIG. 4A is a side elevation view of the vane 400 and FIG. 4B is a cross-sectional view along the line B-B shown in FIG. 4A. The vane 400 defines an interior hollow body structure (airfoil body 402) with an internal vane path 404 (e.g., airfoil cavity). The internal vane path 404 is defined within the structure or body of the vane 400. With reference to both FIGS. 4A and 4B, the vane 400 includes a leading edge 406 and a trailing edge 408, with a pressure side wall 410 and a suction side wall 412 extending in a substantially axial direction (relative to engine axis) from the leading edge 404 to the trailing edge 406.

As shown in FIG. 4A, the airfoil body 402 extends in a substantially radial direction (relative to engine axis) between an inner diameter platform 414 and an outer diameter platform 416. At an inner diameter end 418 of the airfoil body 402, the internal vane path 404 is open and may be fluidly connected to an impeller, such as shown and described above. Incoming compressed air may enter the internal vane path 404 at the inner diameter end 418 and pass through the interior of the airfoil body 402, and thus provide cooling to the interior surfaces of the vane 400. The compressed air will then exit the internal vane path 404 at an outer diameter end 420 through an opening in the outer diameter platform 416, which may open into a combustor cavity, as shown and described above.

As noted above, the amount of airflow directed from the compressor section through the internal vane paths of the vanes of the present disclosure may be controlled or accommodated by adjusting features of the first vanes of the turbine sections of the engine. For example, the vane 400 has an axial length 422, a radial height 424, and a circumferential width 426. Each of the vane dimensions 422, 424, 426 may be adjusted to accommodate the necessary airflow that is output from an upstream compressor section and operation of the downstream combustor. For example, one or both of the axial length 422 and the circumferential width 426 may be increased to increase a total cross-sectional area of the internal vane path 404, and thus permit a larger volume of flow through the internal vane path 404. Consideration may also be given for the amount of cooling provided to the internal surfaces of the airfoil body 402 to ensure heat pickup and removal is achieved by a compressed air flow through the internal vane path 404.

Furthermore, in accordance with some embodiments, the dimensions of the of the internal vane path 404 may not be uniform in a flow direction. For example, as noted above, the internal vane path 404 may be part of a diffusion system, where the compressed air begins to expand and diffuse as it passes through the internal vane path 404. Accordingly, in some embodiments, the axial length 422 and/or the circumferential width 426 may be narrower or smaller at the inner diameter end 418 than the respective axial length 422 and/or circumferential width 426 at the outer diameter end 420. Stated another way, the cross-sectional area of the internal vane path 404 may gradually increase from the inner diameter end 418 to the outer diameter end 420, and thus define or provide a diffusing structure directly within the first vane 400. Such narrow inner diameter and wider outer diameter is illustrated by dashed lines 428 shown in FIG. 4A. In some such configurations, the material of the airfoil body 402 at the inner diameter end 418 may be thicker than the material at the outer diameter end 420. In other configurations, the structure of the airfoil body 402 may be narrowed as well, such that the distance between the leading edge 406 and the trailing edge 408 at the inner diameter end 418 is less than the distance between the leading edge 406 and the trailing edge 408 at the outer diameter end 420.

Advantageously, embodiments described herein provide for gas turbine engines with modified arrangements that provide for improved cooling, improved efficiencies, and reduced axial length, among other benefits and features. With respect to cooling, as noted above, compressor air is directed into the impeller of a centrifugal compressor and then into and through an internal passage of the turbine section (e.g., first vane). This direct cooling avoids the need for bleeding compressed air and routing it to cool the vanes from forward locations of the engine. That is, the compressed air, as it flows from the impeller to the combustion cavity around the combustor will also provide cooling to the turbine vanes. With respect to efficiencies, because less (or no) bleed air is required, a smaller engine configuration may be possible. For example, in a conventional, axially arranged engine, over 15% of core flow may be extracted from the compressor section and routed around the combustor section to supply cooling air to the turbine vanes. However, advantageously, by directly routing the entire core flow through the interior of the turbine vanes, cooling is applied directly thereto without the need for any bleed air for cooling. Accordingly, up to 15% or greater efficiency in terms of bleed air may be achieved.

As noted, a reduced axial length of the engine core may be achieved by implementation of embodiments of the present disclosure. For example, by arranging a portion of the impeller of the compressor section to be axially aligned with a portion of the combustor section of the engine, but arranged radially inward from the combustor section, the total length of the engine may be reduced. For example, and without limitation, the engine core may be reduced in length by up to 6 inches or more.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A gas turbine engine comprising:
   a compressor section comprising an impeller configured to compress a core flow;

a combustor section comprising a combustor, wherein the combustor is arranged downstream from the compressor section along a path of the core flow; and a turbine section arranged downstream from the combustor section along the path of the core flow, wherein the turbine section comprises a plurality of first vanes arranged at an outlet of the combustor, wherein at least one first vane of the plurality of first vanes comprises an internal vane path;

wherein the path of the core flow, in a flow direction, passes through the impeller of the compressor section, the internal vane path internal to the first vane, the combustor, and then between external surfaces of the plurality of first vanes to enter the turbine section.

2. The gas turbine engine of claim 1, wherein at least a portion of the impeller is arranged radially inward from the combustor and at the same axial position as the combustor along an engine axis.

3. The gas turbine engine of claim 1, wherein the internal vane path has an increasing cross-sectional area extending in a direction of flow of the core flow.

4. The gas turbine engine of claim 1, wherein the combustor is arranged within a combustor cavity and the internal vane path fluidly connects the impeller with the combustor cavity.

5. The gas turbine engine of claim 4, wherein the combustor cavity comprises an inner diameter portion, wherein compressed air supplied through the internal vane path fills, at least, the inner diameter portion.

6. The gas turbine engine of claim 5, wherein the inner diameter portion is defined in a radial direction relative to an engine axis between an outer diameter surface of a part of the compressor section and an inner diameter surface of the combustor.

7. The gas turbine engine of claim 1, wherein the path of the core flow is in an axial forward direction through at least a portion of the compressor section and is turned in a radially outward direction by the impeller and flows radially outward through the internal vane path into a combustor cavity housing the combustor.

8. The gas turbine engine of claim 7, wherein the core flow path is turned to flow axially aft relative to the engine axis as it exits the internal vane path to surround the combustor and provide air thereto.

9. The gas turbine engine of claim 8, further comprising a diffuser element attached to an outer diameter platform of the first vane, wherein the internal vane path fluidly connects to the diffuser element, the diffuser element configured to diffuse and direct the core flow around the combustor.

10. The gas turbine engine of claim 1, wherein each first vane of the plurality of first vanes includes an internal vane path.

11. The gas turbine engine of claim 1, wherein the plurality of first vanes extend in a radial direction relative to an engine axis between an inner diameter platform and an outer diameter platform, wherein an outlet of the impeller is fluidly coupled to the inner diameter platform.

12. The gas turbine engine of claim 11, further comprising a diffusing element arranged at an outlet of the internal vane path.

13. The gas turbine engine of claim 12, wherein the outer diameter platform comprises a diffuser element mount, wherein the diffusing element is attached to the outer diameter platform at the diffuser element mount.

14. The gas turbine engine of claim 12, wherein each first vane of the plurality of first vanes includes an internal vane path and each first vane of the plurality of first vanes includes a respective diffusing element arranged at an outlet of the respective internal vane path.

15. The gas turbine engine of claim 11, wherein the internal vane path has a smaller cross-sectional area at the inner diameter platform than a cross-sectional area at the outer diameter platform.

16. The gas turbine engine of claim 1, wherein each first vane of the plurality of first vanes is angled in a direction of rotation of a rotating assembly of the gas turbine engine to direct the core flow as it exits the combustor in the direction of rotation of the rotating assembly.

17. A method of operating a gas turbine engine, the gas turbine engine comprising a compressor section, a combustor section, and a turbine section, wherein at least a portion of the compressor section is arranged axially aligned with a combustor of the combustor section and radially inward from the combustor, the method comprising:

compressing air of a core flow through an impeller of the compressor section;

directing the compressed air through an internal vane path of at least one first vane of a plurality of first vanes of the turbine section as a radial direction flow;

receiving the compressed air within the combustor to generate hot combustion gas; and directing the hot combustion gas between the plurality of first vanes and into the turbine section.

18. The method of claim 17, further comprising diffusing the core flow through the internal vane path.

19. The method of claim 17, further comprising diffusing the core flow through a diffuser element attached to an outlet of the internal vane path.

20. The method of claim 17, further comprising turning a flow of the hot combustion gas as it passes between the plurality of first vanes in a direction of rotation of a rotating assembly of the gas turbine engine.

* * * * *